Oct. 19, 1948.    J. B. MIDDLETON    2,452,017
METHOD OF MIXING ALKYLATION REACTANTS
Filed Dec. 10, 1941
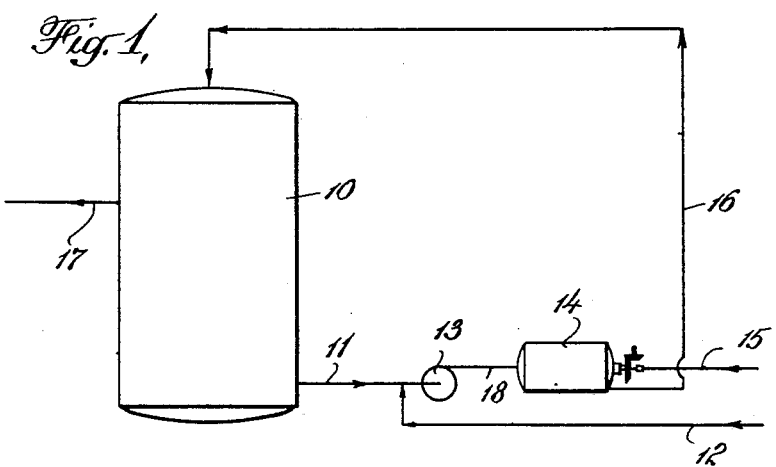
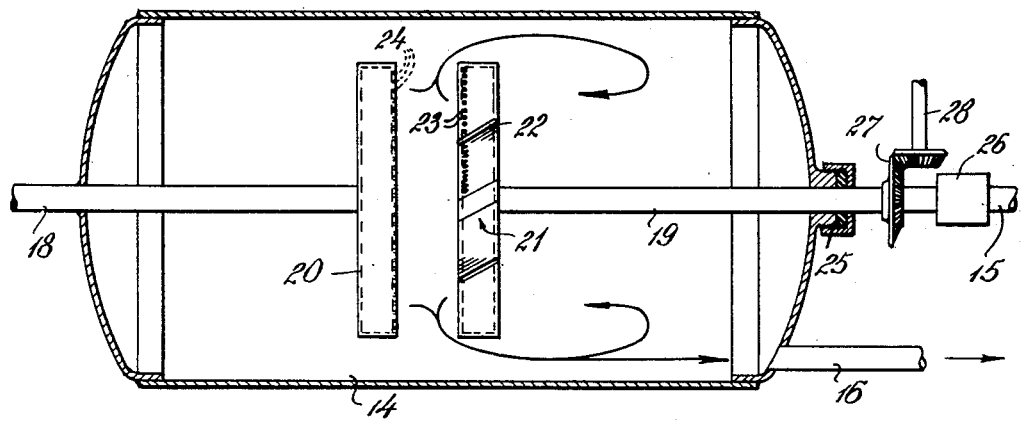
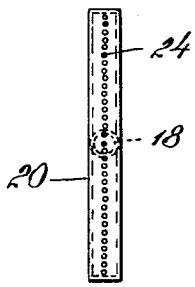
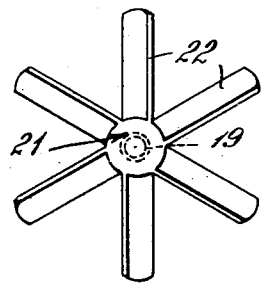
INVENTOR
JULIUS B. MIDDLETON
BY Oswald G. Hayes
ATTORNEY Patented Oct. 19, 1948

2,452,017

UNITED STATES PATENT OFFICE 2,452,017

METHOD OF MIXING ALKYLATION REACTANTS

Julius B. Middleton, Beaumont, Tex., assignor to Socony-Vacuum Oil Company, Incorporated, New York, N. Y., a corporation of New York Application December 10, 1941, Serial No. 422,362

1 Claim. (Cl. 260—683.4)

This invention relates to methods and apparatus for introducing a reactant or reactants to a chemical process and is particularly concerned with operations of that type wherein the added reactant or reactants are injected into a stream of previously formed reaction mixture.

The apparatus disclosed and the specific process steps described hereinafter as illustrative of the invention are admirably adapted to the requirements of processes for the alkylation of iso-paraffins, by reaction with olefins in the presence of a suitable alkylation catalyst such as the acid catalysts, sulphuric, hydrofluoric, etc. The organic reactants and the acid catalyst in such processes are mutually immiscible and because of the rather great difference in specific gravities they tend to separate. It is, therefore, necessary to provide for adequate agitation of the mass during mixing and throughout the desired time of contact between reactants and catalyst. Further requirements of the process arise from the facility with which the olefin polymerizes in the presence of the catalyst, thus reducing the yield available. The latter problem is commonly overcome in large measure by conducting the reaction in the presence of a very large excess of iso-paraffins to promote the alkylation reaction and suppress polymerization. Both these desired conditions are advantageously achieved to a substantial extent by establishment of a reaction zone from which a portion of the reaction mass is withdrawn for separation of product and another portion drawn off and passed through a circuit external to the reaction. Fresh catalyst and reactants are added to the stream in the external circuit and the resultant mixture of catalyst, reactants, reaction products and reaction by-products is then returned to the reaction zone. The agitation provided by recirculated reaction mixture aids materially in promoting adequate contact and the excess of paraffin hydrocarbon which accumulates in the reaction mixture provides a reaction medium for fresh reactants having a very high ratio of paraffin to olefin at the time the olefin first contacts the catalyst.

It should be noted that the term "reaction zone" as used herein applies to an enclosed space wherein the reaction is largely conducted. It is undoubtedly true that reaction occurs to a substantial extent in parts of the apparatus not included within the reactant zone, and use of the term is not to be understood as excluding reaction in the external circuit.

Results are far from ideal, however, and attempts have been made to improve the conditions of the reaction by increasing the ratio of paraffin to olefin at various points in the circuit where reaction occurs. Many of the previously suggested expedients to this end are valuable aids in the process and utilization of such as may be of help is contemplated in commercial embodiments of the invention. The present invention contemplates obtaining superior results in processes of the present type by utilizing a novel concept of mixing fresh reactants with the emulsion in the external circuit. According to the present invention, a cyclic circulation of reaction mixture is established in a mixing zone external to the reaction zone and the fresh reactants are added to the fluids so circulated in said zone. The invention provides means and process steps whereby a more thorough mixing is accomplished and, even more important, the reaction of fresh feed materials is caused to take place in an environment having an extremely high ratio of paraffin to olefin, whereby a high yield of good quality alkylate is obtained.

In principle, the invention contemplates the provision of a body of fluid moving within a mixing zone and injection of fresh feed into the said body while continuously adding fresh fluid of similar composition thereto and withdrawing the partially reacted mixture therefrom.

Further objects and advantages of the invention will be apparent from discussion of a preferred embodiment thereof, apparatus therefor being shown in the annexed drawings; wherein Figure 1 is a diagrammatic showing of an alkylation unit embodying the principles of the invention;

Figure 2 is an enlarged view in partial section of the mixing device of the unit shown in Figure 1;

Figure 3 is an elevation of the means for admitting fresh feed to the chamber of the mixing device; and Figure 4 is an elevation of the injector for recirculated emulsion.

Referring specifically to Figure 1, the unit for catalytic alkylation, such as the reaction between iso-butane and butene in the presence of a mineral acid, includes a reactor 10 having a discharge line 11 for removing emulsion from the reaction mass within said reactor. Fresh acid catalyst is added to the emulsion through line 12 and the mixture is then passed through a pump 13 which mixes the mass and propels it to mixer 14. Fresh feed in the form of a mixture of isobutane and butene in the ratio of between 6 and 7 to 1 is supplied to mixer 14 from pipe 15. The mass resulting from mixing of fresh feed with recirculated emulsion is withdrawn from the mixer 14 and passed through line 16 to the reactor 10. A further portion of the reaction mass is withdrawn from reactor 10 through discharge 17, preferably continuously, and passed to apparatus for separation of product and unreacted material from spent acid catalyst. It is to be understood, of course, that the illustrated unit is capable of extensive modification in connection with cooling apparatus, recycling of acid and/or hydrocarbons separated from the mixture withdrawn through line 17 and numerous other respects. This invention is concerned primarily with the mixing device and the process practiced therein, wherefor only elements of the system essential to an understanding of the operation of the mixer and its function in a complete plant have been illustrated.

The mixer comprises a shell defining the mixing zone together with means for adding the materials to be mixed and means for withdrawing the mixture prepared in the mixing zone. Emulsion withdrawn from the reactor and having acid catalyst admixed therewith enters the mixer through pipe 18, while the fresh feed stock is introduced to the mixing zone through pipe 19. The mixture from pipe 18 passes through a distributing head 20 and enters the actual mixing zone as a plurality of fine streams issuing from a number of small orifices 24 in the face of the head 20. Fresh feed entering through pipe 19 passes to the interior of a rotatable hollow impeller 21 having a plurality of radial vanes or blades 22 each pitched so that the assembly has a propeller effect when rotated about its axis. Each of the blades has a line of small orifices 23 disposed as shown and communicating with the interior of the impeller 21, in order that fluid under pressure admitted through pipe 19 will pass out through said orifices and impart a turning moment by a reaction effect to the impeller 21 tending to turn it in a direction to cause flow of fluid longitudinally of the mixer and through the mid-region thereof toward the distributing head 20.

The pipe 19 is mounted for rotation about its axis in the end wall of the shell of mixer 14 by means of a packing gland indicated generally at 25. A fluid-tight rotatable connection 26 is made between pipes 19 and 15.

While the reaction effect of the fluid issuing from orifices 23 will often suffice to cause rotation of impeller 21 at a feasible rate, it is desirable in some cases to provide auxiliary or supplemental means for rotating the impeller assembly. This purpose may be served advantageously by a bevel gear 27 keyed to the pipe 19 and meshing with a bevel gear on a shaft 28 driven from a suitable source of power not shown.

It will be apparent that in operation the impeller turns in a direction to cause a vigorous circulation of fluids in the mixing chamber in the manner indicated by the flow lines in Figure 2. The stream flowing past each blade 22 is composed of acid catalyst, butene and isobutane with the latter heavily predominant, and products of the reaction. Each small stream issuing from an orifice 23 contains butene in relatively small quantities and is immediately further diluted as regards the butene content as it contacts acid catalyst which is already spent to a minor degree and mixed with other materials. This contact results in reaction of a portion of the butene with iso-butane and by the time contact is made with the relatively stronger acid catalyst issuing from distributing head 20, the concentration of butene has been further reduced. The mass resulting from admixture with the stream from line 18 is then caused to pass toward the outer portion of the mixing zone around to the rear of the impeller 21. A portion of the mass so circulated is withdrawn from the mixing zone and passed to the reactor as partially reacted reaction mass, while the remainder again passes through the blades of the impeller 21 to repeat the cycle.

It will be recognized by those skilled in the art that coolers, valves and other accessories are desirable for operations at high efficiency, but these constitute no part of the invention and, since, they must vary with changes in design of various elements of a complete plant and with the specific nature and amounts of materials fed to the system, are not illustrated here.

I claim:

In an alkylation process which includes maintaining a fluid reaction mass resulting from reaction of an olefin with an isoparaffin in the presence of a liquid acid catalyst, withdrawing a portion of said mass for separation of product therefrom, withdrawing a second portion of said mass, adding fresh reactants and catalyst thereto and returning said second portion admixed with fresh reactants and catalyst to said reaction zone; the method of admixing said catalyst and reactants with said second portion which comprises adding fresh catalyst to said second portion and injecting the same as a plurality of parallel fine catalyst mixture streams longitudinally of a substantially cylindrical mixing zone maintained substantially full of liquid, withdrawing a fluid mixture from the end of said mixing zone toward which said catalyst mixture streams are directed, inducing cyclic flow of fluids in said mixing zone to cause fluids to flow longitudinally along the axis thereof from said end of said mixing zone toward said catalyst mixture streams and return flow along an annular path surrounding said flow toward said streams, injecting fresh reactants as a plurality of fine reactant streams into said return flow and rotating the points of injection of said reactant streams about the axis of said mixing zone; whereby said fresh reactants are dispersed uniformly through a stream of reaction mixture in which fresh catalyst has been uniformly distributed.

JULIUS B. MIDDLETON.

REFERENCES CITED

The following references are of record in the file of this patent:

UNITED STATES PATENTS

| Number | Name | Date |
|---|---|---|
| 297,969 | Carver | May 6, 1884 |
| 1,815,366 | Straftord | July 21, 1931 |
| 2,043,084 | Ward | June 2, 1936 |
| 2,102,548 | Stratford | Dec. 14, 1937 |
| 2,148,178 | Shropshire | Feb. 21, 1939 |
| 2,171,250 | Archibald | Aug. 29, 1939 |
| 2,173,452 | Merley | Sept. 19, 1939 |
| 2,187,746 | Lefevre | Jan. 23, 1940 |
| 2,212,261 | Brothman | Aug. 20, 1940 |
| 2,220,090 | Evering | Nov. 5, 1940 |
| 2,232,674 | Pyzel | Feb. 18, 1941 |
| 2,238,802 | Altschuler | Apr. 15, 1941 |
| 2,245,038 | Holm | June 10, 1941 |
| 2,267,097 | Hatch | Dec. 23, 1941 |
| 2,271,860 | Goldsby | Feb. 3, 1942 |
| 2,281,248 | Putney | Apr. 28, 1942 |